Patented July 14, 1942

2,289,476

UNITED STATES PATENT OFFICE 2,289,476

DISINFECTANT EMULSION

Amos Edison Badertscher, Baltimore, Md., assignor to McCormick and Company, Inc., Baltimore, Md., a corporation of Maryland No Drawing. Application March 24, 1941,
Serial No. 384,959

11 Claims. (Cl. 167—31)

My invention relates to disinfectants, particularly emulsions of the oil-water type which are stable and have improved germ killing power.

Heretofore use has been made of aqueous suspensions of phenols as disinfectants, fungicidal and insecticidal products but it has been difficult to produce stable mixtures which can be stored and diluted without encountering flaking, crystallizing or separating out of the chemical ingredients. Further, when employing solid phenol compounds it has been necessary to use very finely divided particles so that the compound can be readily dispersed throughout the mixture. This increases the production cost. Moreover, the stability of the product is not improved.

Insecticidal compositions have been made heretofore comprising orthophenylphenol which are adapted to be stirred into water to form temporary suspensions but these compositions are not compounded so as to prevent or inhibit the crystallizing out of the orthophenylphenol.

I have discovered that disinfectant emulsions of improved stability and germ killing efficiency can be made utilizing orthophenylphenol as the principal disinfectant ingredient.

After considerable research and the formulating and testing of a large number of compositions I have discovered that emulsions of orthophenylphenol can be made which are relatively stable by incorporating terpene ether with orthophenylphenol. Germicidal emulsions made according to my invention by combining terpene ether and orthophenylphenol exhibit the unique property of being stable even upon dilution. The chemical ingredients are incorporated with sulphonated castor oil or a similar oil-water emulsifying agent to form an efficient disinfectant. My experiments indicate that the terpene ether and orthophenylphenol act synergistically, and prevent crystallizing out of the compounds so that they remain uniformly dispersed throughout the vehicle forming an improved disinfectant emulsion. This is the principal object of my invention.

Typical examples of disinfectant emulsions compounded according to my invention have the following composition by weight:

Example I

| | Per cent |
|---|---|
| Orthophenylphenol | 10 |
| Sulphonated castor oil | 90 |

The orthophenylphenol is preferably incorporated in the sulphonated castor oil as a liquid. The disinfectant material orthophenylphenol is crystalline at ordinary room temperature but melts at about 130° F. In this liquid state it can be emulsified with a sulphonated castor oil, soap or a sulphated alcohol. Preferably, sulphonated castor oil is used. The sulphonated castor oil or so-called Turkey red oil, which was utilized contained approximately 25% water, about 25% saponified oil and the remainder of the oil was sulphonated. This oil forms an emulsion in water. In the example given it was noted that a slight flaking out of the chemical ingredient resulted in a few days and an unstable emulsion was formed on dilution with water. Moreover the formulation of Example I did not possess the required phenol coefficient. This should be approximately 8 when tested by the Food and Drug Administration test utilizing the organism *Eberthella typhosa*.

Example II

| | Per cent |
|---|---|
| Orthophenylphenol | 10 |
| Isopropyl alcohol | 10 |
| Sulphonated castor oil | 80 |

This emulsion appeared to be more stable upon dilution with water. When orthophenylphenol was increased 20% this showed slight flaking out of the chemical upon standing and upon dilution with water.

Example III

| | Per cent |
|---|---|
| Orthophenylphenol | 20 |
| Isopropyl alcohol | 10 |
| Steam distilled pine oil | 10 |
| Sulphonated castor oil | 60 |

Example IV

| | Per cent |
|---|---|
| Orthophenylphenol | 30 |
| Steam distilled pine oil | 10 |
| Isopropyl alcohol | 10 |
| Sulphonated castor oil | 50 |

The emulsions of Examples III and IV were not stable upon standing but when diluted a small amount of oil separated out on top. When tested by the above mentioned F. D. A. method the phenol coefficient was somewhat above 8 on *E. typhi*.

In order to provide a more stable emulsion and eliminate the odor of pine oil the following compositions were formulated:

Example V

| | Per cent |
|---|---|
| Orthophenylphenol | 10 |
| Terpene ether | 10 |
| Sulphonated castor oil | 80 |

This composition had a phenol coefficient of 2.5 on *E. typhi* by the F. D. A. method.

Example VI

| | Per cent |
|---|---|
| Orthophenylphenol | 15 |
| Terpene ether | 10 |
| Sulphonated castor oil | 75 |

This composition had a phenol coefficient of 5 on *E. typhi* by the F. D. A. method.

Example VII

| | Per cent |
|---|---|
| Orthophenylphenol | 20 |
| Terpene ether | 10 |
| Sulphonated castor oil | 70 |

This composition had a phenol coefficient of 6.5 on *E. typhi* by the F. D. A. method.

Example VIII

| | Per cent |
|---|---|
| Orthophenylphenol | 25 |
| Terpene ether | 10 |
| Sulphonated castor oil | 65 |

This composition had a phenol coefficient of 9 on *E. typhi* by the F. D. A. method.

Example IX

| | Per cent |
|---|---|
| Orthophenylphenol | 30 |
| Terpene ether | 10 |
| Sulphonated castor oil | 60 |

This composition had a phenol coefficient of 12 on *E. typhi* by the F. D. A. method.

Example X

| | Per cent |
|---|---|
| Orthophenylphenol | 40 |
| Terpene ether | 10 |
| Sulphonated castor oil | 50 |

In this example the composition had a phenol coefficient of 13 on *E. typhi* by the F. D. A. method.

All of the emulsions formulated as in Examples V to X were stable and the formula having a phenol coefficient closest to 8 by the F. D. A. method on *E. typhi* was that of Example VIII comprising 25% orthophenylphenol, 10% terpene ether and 65% sulphonated castor oil. Stock emulsions made up according to Example VIII were stable and the orthophenylphenol did not separate out even when the emulsion was diluted after storage. If desired the amount of terpene ether may be varied between a range of e. g. 5%–15% although I have found that 10% gives the best results.

Orthophenylphenol has a phenol coefficient of 26 on the F. D. A. method on *E. typhi* and the formula containing 25% orthophenylphenol has a phenol coefficient of 9 when tested by the same method on the same organism. In view of this there is an added advantage in using 10% terpene ether aside from the fact that it functions to keep the orthophenylphenol from crystallizing and separating out when the emulsion is diluted with water. I have therefore discovered an improved disinfectant emulsion utilizing orthophenylphenol and terpene ether which is stable and very efficient. The product produced comprising orthophenylphenol, terpene ether and sulphonated castor oil, according to my invention may be diluted at the rate of one ounce of disinfectant emulsion to one gallon of water and will retain its germ killing efficiency for a period of thirty days. The combined use of terpene ether with orthophenylphenol resulted in unexpectedly producing a very stable and highly active germ killing disinfectant. The particular combination of phenol and ether compounds performs the dual function of rendering the emulsion more stable and serving to inhibit the crystallizing tendency of the orthophenylphenol.

The compositions illustrated in the examples are merely typical formulations and it will be understood that other hydroxybiphenyls may be utilized in place of orthophenylphenol. The terpene ethers used are characterized by containing an ether linkage connecting the terpenic group with another group and the terpene compounds need not be in pure form.

In place of sulphonated castor oil other sulphonated fatty oils may be utilized as well as sulphite waste liquor and the like wetting and emulsifying agents. In addition, inert fillers such as diatomaceous earth, bentonite, chalk and the like may be incorporated to provide a composition having the desired consistency.

Further, it will be appreciated that in the above examples the particular amounts of the ingredients may be varied somewhat as to the relative proportions, so long as a staple disinfectant product is formed having a phenol coefficient of approximately 8 by the F. D. A. method *E. typhi*.

It will be understood further that the examples herein set forth are merely illustrative and that they may be varied to suit different conditions and uses to which my invention is to be used without departing broadly from the spirit and the scope of my invention as defined by the appended claims.

Having thus full described my invention, what I claim as new and desire to secure by Letters Patent, is:

1. A disinfectant composition comprising an ether of terpene, hydroxybiphenyl, and an emulsifying agent, said composition having a phenol coefficient exceeding the aggregate coefficient of the individual ingredients thereof.

2. A disinfectant composition comprising orthophenylphenol, terpene ether, and an emulsifying agent, said composition having a phenol coefficient exceeding the aggregate coefficient of the individual ingredients thereof.

3. A disinfectant composition in the form of an emulsion comprising orthophenylphenol and terpene ether, said composition having a phenol coefficient exceeding the aggregate coefficient of the individual ingredients thereof, said coefficient being at least 8 by the F. D. A. method on *E. typhi*.

4. A disinfectant emulsion comprising orthophenylphenol, terpene ether, and an emulsified agent, said composition having a phenol coefficient exceeding the aggregate coefficient of the individual ingredients thereof, said coefficient being at least 8 by the F. D. A. method on *E. typhi*.

5. A disinfectant composition comprising an emulsion of a phenylphenol compound and a terpene ether, said composition having a phenol coefficient exceeding the aggregate coefficient of the individual ingredients thereof, said coefficient being at least 8 by the F. D. A. method on *E. typhi*.

6. A disinfectant composition comprising an emulsion of terpene ether and a phenylphenol compound, said phenylphenol being incorporated in an amount sufficient to produce a phenol coefficient of approximately 8 as tested by the F. D. A. method on *E. typhi*, said amount of phenylphenol being per se insufficient to produce said phenol coefficient.

7. A disinfectant emulsion comprising by weight 10% to 40% orthophenylphenol, 5% to 15% terpene ether and the remainder sulphonated castor oil.

8. A disinfectant emulsion comprising by weight 25% orthophenylphenol, 10% terpene ether and 65% sulphonated castor oil.

9. A disinfectant composition comprising an emulsifying agent, orthophenylphenol and terpene ether in amount sufficient to produce a composition having a phenol coefficient of approximately 8 by the F. D. A. method on *E. typhi*, said coefficient being greater than the aggregate coefficient of the individual components of said composition.

10. A disinfectant emulsion comprising orthophenylphenol, terpene ether, sulphonated fatty oil, said sulphonated fatty oil comprising a major constituent and including orthophenylphenol to produce a disinfectant having a phenol coefficient of approximately 8 by the F. D. A. method on *E. typhi*.

11. A disinfectant emulsion comprising orthophenylphenol, terpene ether and an emulsifying agent, said terpene ether being incorporated in an amount sufficient to inhibit the crystallizing out of the orthophenylphenol constituent, and said emulsion having a phenol coefficient greater than the aggregate of the individual components thereof, said coefficient being at least 8 by the F. D. A. method on *E. typhi*.

A. EDISON BADERTSCHER.